United States Patent
Yoshida

(10) Patent No.: US 10,136,028 B2
(45) Date of Patent: Nov. 20, 2018

(54) CONTROL DEVICE PERFORMING ERROR DIFFUSION PROCESS USING MODIFIED EVALUATED DENSITY VALUE

(71) Applicant: BROTHER KOGYO KABUSHIKI KAISHA, Nagoya-shi, Aichi-ken (JP)

(72) Inventor: Yasunari Yoshida, Aichi-ken (JP)

(73) Assignee: BROTHER KOGYO KABUSHIKI KAISHA, Nagoya-Shi, Aichi-Ken (JP)

( * ) Notice: Subject to any disclaimer, the term of this patent is extended or adjusted under 35 U.S.C. 154(b) by 0 days.

(21) Appl. No.: 15/686,288

(22) Filed: Aug. 25, 2017

(65) Prior Publication Data

US 2018/0097969 A1    Apr. 5, 2018

(30) Foreign Application Priority Data

Sep. 30, 2016  (JP) .................................. 2016-193429

(51) Int. Cl.

| H04N 1/405 | (2006.01) |
|---|---|
| B41J 2/045 | (2006.01) |
| H04N 1/40 | (2006.01) |
| H04N 1/52 | (2006.01) |
| B41J 2/21 | (2006.01) |

(Continued)

(52) U.S. Cl.
CPC ........ *H04N 1/4052* (2013.01); *B41J 2/04508* (2013.01); *B41J 2/04535* (2013.01); *B41J 2/04586* (2013.01); *B41J 2/2132* (2013.01); *G06K 15/107* (2013.01); *G06K 15/1881* (2013.01); *H04N 1/4053* (2013.01);
(Continued)

(58) Field of Classification Search
CPC .... H04N 1/40087; H04N 1/52; H04N 1/4053; H04N 1/4057; H04N 1/4052; H04N 1/00411; B41J 2/2132; B41J 2/04586; B41J 2/04508; B41J 2/04535; G06K 15/07; G06K 1/405; G06K 12/1881
See application file for complete search history.

(56) References Cited

U.S. PATENT DOCUMENTS 9,185,264 B2 * 11/2015 Yoshida ............... H04N 1/4052
2007/0274602 A1 * 11/2007 Iriyama ............... H04N 1/4052
                                                                 382/252

(Continued)

FOREIGN PATENT DOCUMENTS

| JP | 2000-25212 A | 1/2000 |
|---|---|---|
| JP | 2011-131430 A | 7/2011 |

*Primary Examiner* — Sharon A Polk
(74) *Attorney, Agent, or Firm* — Merchant & Gould P.C.

(57) ABSTRACT

In an error diffusion process, a control device determines a dot value of a target pixel by using a gradation value of the target pixel, and an error value. The control device determines distribution error value by comparing a gradation dependent value with a first evaluated density value indicating a density of a first dot. The control device determines the distribution error value by using the first evaluated density value when the dot value of the target pixel indicates formation of the first dot and when the gradation dependent value is smaller than or equal to the first evaluated density value. The control device determines the distribution error value by using a modified evaluated density value greater than the first evaluated density value when the dot value indicates formation of the first dot and when the gradation dependent value is greater than the first evaluated density value.

20 Claims, 9 Drawing Sheets

(51) Int. Cl.
*G06K 15/10* (2006.01)
*G06K 15/02* (2006.01)
*H04N 1/00* (2006.01)

(52) U.S. Cl.
CPC ....... *H04N 1/4057* (2013.01); *H04N 1/40087* (2013.01); *H04N 1/52* (2013.01); *H04N 1/00411* (2013.01)

(56) References Cited

U.S. PATENT DOCUMENTS

2016/0034797 A1* 2/2016 Yoshida ............... H04N 1/4052
    358/1.9
2017/0282590 A1* 10/2017 Ozawa ................... B41J 2/2132

* cited by examiner

FIG. 3

NOZZLE PROPERTY TABLE NPT

SUB-TABLE FOR NOZZLE K

| NOZZLE NUMBER | PROPERTY VALUE PK |
|---|---|
| NK1 | −5 |
| NK2 | −3 |
| NK3 | 0 |
| ⋮ | ⋮ |
| NKn−2 | 2 |
| NKn−1 | 1 |
| NKn | 4 |

SUB-TABLE FOR NOZZLE C

| NOZZLE NUMBER | PROPERTY VALUE PC |
|---|---|
| NC1 | −3 |
| NC2 | −1 |
| NC3 | 1 |
| ⋮ | ⋮ |
| NCn−2 | 3 |
| NCn−1 | 2 |
| NCn | 5 |

SUB-TABLE FOR NOZZLE M

| NOZZLE NUMBER | PROPERTY VALUE PM |
|---|---|
| NM1 | 3 |
| NM2 | 3 |
| NM3 | −1 |
| ⋮ | ⋮ |
| NMn−2 | 10 |
| NMn−1 | 12 |
| NMn | 6 |

SUB-TABLE FOR NOZZLE Y

| NOZZLE NUMBER | PROPERTY VALUE PY |
|---|---|
| NY1 | 4 |
| NY2 | 3 |
| NY3 | 1 |
| ⋮ | ⋮ |
| NYn−2 | −6 |
| NYn−1 | −3 |
| NYn | −2 |

CONTROL DEVICE PERFORMING ERROR DIFFUSION PROCESS USING MODIFIED EVALUATED DENSITY VALUE

CROSS REFERENCE TO RELATED APPLICATION

This application claims priority from Japanese Patent Application No. 2016-193429 filed Sep. 30, 2016. The entire content of the priority application is incorporated herein by reference.

TECHNICAL FIELD

The present disclosure relates to a control process for controlling a printing operation to print an image, and particularly to a process for setting a dot value designating a dot formation state for each pixel in the image.

BACKGROUND

Inkjet printers that form dots on paper by ejecting ink from a plurality of nozzles formed in a print head are well known in the art. A conventional image processing apparatus stores a table in which the fluctuating property of an ink ejection quantity is recorded for each nozzle. After the image processing apparatus sets the dot formation state to indicate that a dot is to be formed for a target pixel in an error diffusion process, the image processing apparatus then calculates an error value to be distributed from the target pixel to pixels that have not yet been processed. Here, the image processing apparatus corrects values specifying the densities of dots based on the fluctuating properties recorded in the table and calculates error values based on these corrected density values. Through this process, the image processing apparatus can achieve high-quality printing.

SUMMARY

However, in the conventional method described above, the values specifying dot density are sometimes set too small on the basis of the fluctuating properties of ink ejection quantity for the nozzles. In such cases, an excessively large error may be distributed to unprocessed pixels, potentially leading to the density in parts of the printed image being set higher than that of the original image prior to the error diffusion process. This problem is not restricted to methods that use the fluctuating property of ink ejection quantity, but is common to all methods of the error diffusion process that use a relatively small value to specify dot density.

In view of the foregoing, it is an object of the present disclosure to provide a technique for an error diffusion process capable of preventing the density in parts of a printed image from being set higher than that in the original image prior to performing the error diffusion process.

In order to attain the above and other objects, the disclosure provides a control device having a processor. The processor is configured to perform: acquiring original image data representing an original image, the original image including a plurality of pixels, the original image data including a plurality of gradation values corresponding to respective ones of the plurality of pixels, each of the plurality of gradation values representing a density of a corresponding pixel; performing an error diffusion process to generate dot data including a plurality of dot values corresponding to respective ones of the plurality of pixels, each of the plurality of dot values indicating a dot formation state of a corresponding pixel; and generating print data including the dot data, the print data being processed by a print execution machine to reproduce the original image. The performing includes: determining a dot value of a target pixel selected from among the plurality of pixels by using a gradation value of the target pixel, an error value, and a threshold value, wherein the error value is distributed to the target pixel from a processed pixel which has been selected as a previous target pixel of the error diffusion process; and determining a distribution error value by comparing a gradation dependent value with a first evaluated density value indicating a density of a first dot, the gradation dependent value depending on the gradation value of the target pixel, the distribution error value being to be distributed to an unprocessed pixel for which the error diffusion process has not been performed. The determining a distribution error value includes: determining the distribution error value by using the first evaluated density value when the dot value of the target pixel indicates formation of the first dot and when the gradation dependent value is smaller than or equal to the first evaluated density value; and determining the distribution error value by using a modified evaluated density value greater than the first evaluated density value when the dot value of the target pixel indicates formation of the first dot and when the gradation dependent value is greater than the first evaluated density value.

According to another aspects, the disclosure provides a non-transitory computer readable storage medium storing a set of program instructions installed on and executed by a computer. The set of program instructions includes: acquiring original image data representing an original image, the original image including a plurality of pixels, the original image data including a plurality of gradation values corresponding to respective ones of the plurality of pixels, each of the plurality of gradation values representing a density of a corresponding pixel; performing an error diffusion process to generate dot data including a plurality of dot values corresponding to respective ones of the plurality of pixels, each of the plurality of dot values indicating a dot formation state of a corresponding pixel; and generating print data including the dot data, the print data being processed by a print execution machine to reproduce the original image. The performing includes: determining a dot value of a target pixel selected from among the plurality of pixels by using a gradation value of the target pixel, an error value, and a threshold value, wherein the error value is distributed to the target pixel from a processed pixel which has been selected as a previous target pixel of the error diffusion process; and determining a distribution error value by comparing a gradation dependent value with a first evaluated density value indicating a density of a first dot, the gradation dependent value depending on the gradation value of the target pixel, the distribution error value being to be distributed to an unprocessed pixel for which the error diffusion process has not been performed. The determining a distribution error value includes: determining the distribution error value by using the first evaluated density value when the dot value of the target pixel indicates formation of the first dot and when the gradation dependent value is smaller than or equal to the first evaluated density value; and determining the distribution error value by using a modified evaluated density value greater than the first evaluated density value when the dot value of the target pixel indicates formation of the first dot and when the gradation dependent value is greater than the first evaluated density value.

According to still another aspects, the disclosure provides a method including: acquiring original image data representing an original image, the original image including a plurality of pixels, the original image data including a plurality of gradation values corresponding to respective ones of the plurality of pixels, each of the plurality of gradation values representing a density of a corresponding pixel; performing an error diffusion process to generate dot data including a plurality of dot values corresponding to respective ones of the plurality of pixels, each of the plurality of dot values indicating a dot formation state of a corresponding pixel; and generating print data including the dot data, the print data being processed by a print execution machine to reproduce the original image. The performing includes: determining a dot value of a target pixel selected from among the plurality of pixels by using a gradation value of the target pixel, an error value, and a threshold value, wherein the error value is distributed to the target pixel from a processed pixel which has been selected as a previous target pixel of the error diffusion process; and determining a distribution error value by comparing a gradation dependent value with a first evaluated density value indicating a density of a first dot, the gradation dependent value depending on the gradation value of the target pixel, the distribution error value being to be distributed to an unprocessed pixel for which the error diffusion process has not been performed. The determining a distribution error value includes: determining the distribution error value by using the first evaluated density value when the dot value of the target pixel indicates formation of the first dot and when the gradation dependent value is smaller than or equal to the first evaluated density value; and determining the distribution error value by using a modified evaluated density value greater than the first evaluated density value when the dot value of the target pixel indicates formation of the first dot and when the gradation dependent value is greater than the first evaluated density value.

BRIEF DESCRIPTION OF THE DRAWINGS

The particular features and advantages of the disclosure as well as other objects will become apparent from the following description taken in connection with the accompanying drawings, in which:

FIG. 3 is an explanatory diagram showing an example of the nozzle property table;

DETAILED DESCRIPTION

A. Embodiment

A-1. Structure of a Printer

Figure 1:
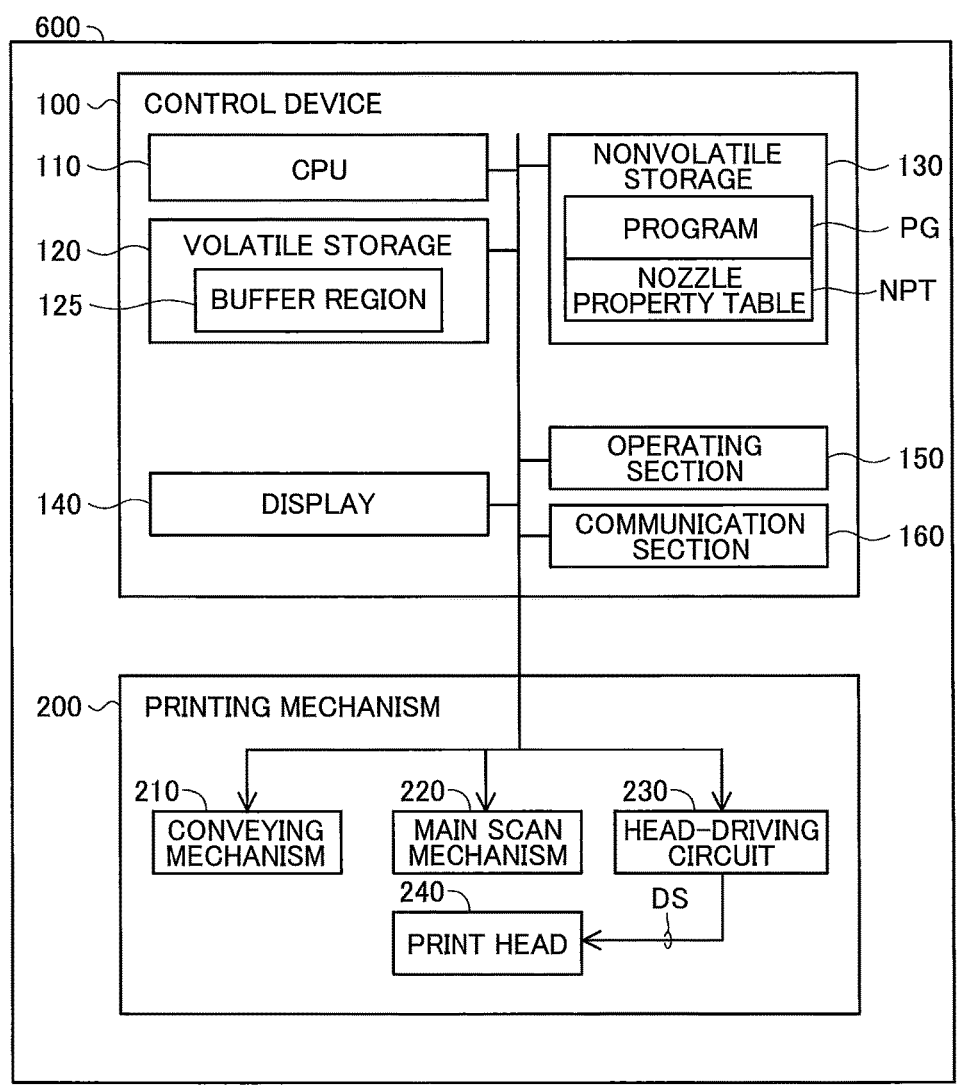
FIG. 1 is a block diagram showing a structure of a printer according to an embodiment.

Next, an embodiment of the present disclosure will be described while referring to the accompanying drawings. FIG. 1 is a block diagram showing a structure of a printer 600 according to the embodiment. The printer 600 is an inkjet printer that prints images on sheets of paper by forming dots on the paper with ink. The printer 600 includes a control device 100 for controlling all operations of the printer 600, and a printing mechanism 200 serving as the print execution machine.

The control device 100 includes a CPU 110 functioning as the controller; a volatile storage 120, such as DRAM; a nonvolatile storage 130, such as flash memory or a hard disk drive; a display 140, such as an liquid crystal display; an operating section 150 having an operating interface, such as a touchscreen superimposed on a liquid crystal display panel, and various buttons; and a communication section 160 having a communication interface for communicating with external apparatuses, such as a personal computer (not shown).

The volatile storage 120 is provided with a buffer region 125 for temporarily storing various intermediate data generated when the CPU 110 performs processes. The nonvolatile storage 130 stores a computer program PG for controlling the printer 600, and a nozzle property table NPT used in a control process described later.

The computer program PG is pre-stored in the nonvolatile storage 130 prior to shipping the printer 600. Note that the computer program PG may be supplied to the user on a DVD-ROM or other storage medium, or may be made available for download from a server. By executing the computer program PG, the CPU 110 implements a control process of the printer 600 described later. The nozzle property table NPT may be incorporated in the computer program PG or supplied together with the computer program PG.

The printing mechanism 200 can perform printing operations by ejecting ink in the colors cyan (C), magenta (M), yellow (Y), and black (K) under control of the CPU 110 in the control device 100. The printing mechanism 200 includes a conveying mechanism 210, a main scan mechanism 220, a head-driving circuit 230, and a print head 240. The conveying mechanism 210 is provided with a conveying motor (not shown) that produces a drive force for conveying sheets of paper along a prescribed conveying path. The main scan mechanism 220 is provided with a main scan motor (not shown) that produces a drive force for reciprocating the print head 240 in the main scanning direction (hereinafter also called a "main scan"). The head-driving circuit 230 provides a drive signal DS to the print head 240 for driving the print head 240 while the main scan mechanism 220 is moving the print head 240 in a main scan. The print head 240 forms dots on a sheet of paper conveyed by the conveying mechanism 210 by ejecting ink according to the drive signal DS. In this description, the process of forming dots on paper while performing a main scan will be called a "pass process" or a "formation process." The CPU 110 of the control device 100 controls the printing mechanism 200 to print an image by repeatedly controlling the printing mechanism 200 to alternately execute a conveying process with the conveying mechanism 210 for conveying the sheet in a conveying direction orthogonal to the main scanning direction (hereinafter called the "sub scanning direction"), and a pass process.

Figure 2:
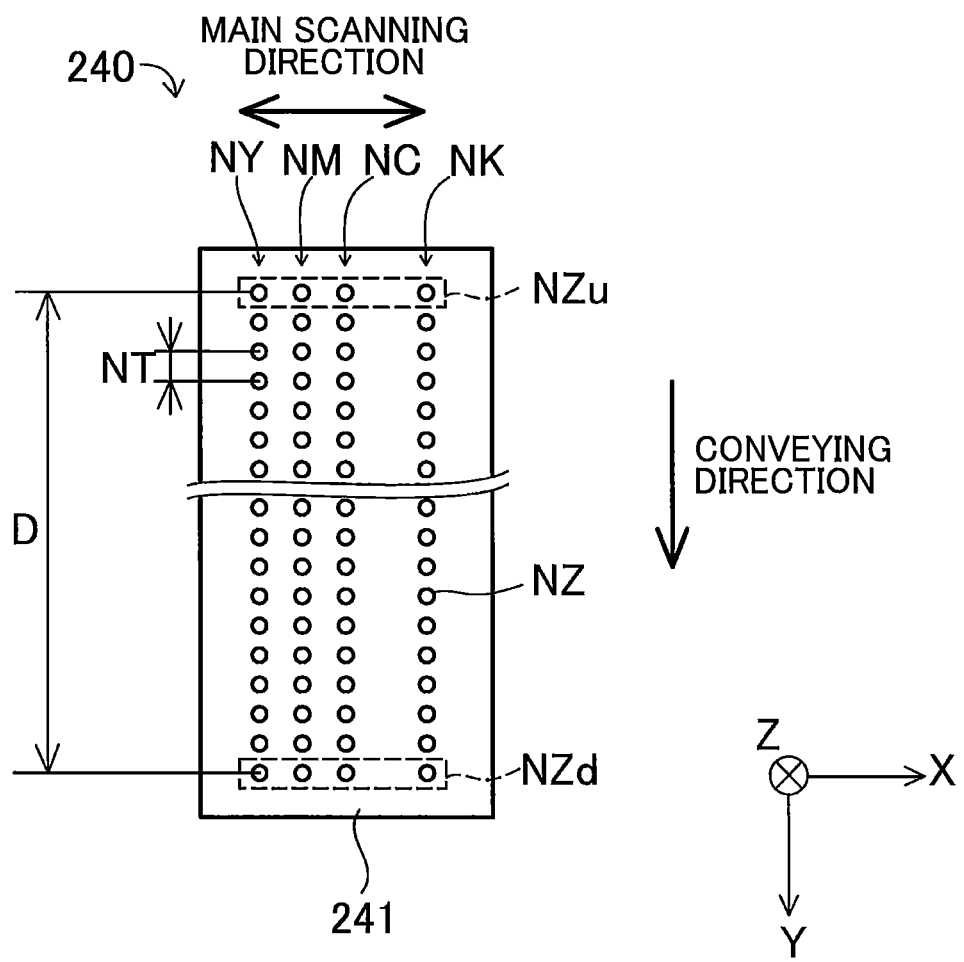
FIG. 2 is an explanatory diagram showing a general structure of a print head provided in the printer shown in FIG. 1.

FIG. 2 shows the general structure of the print head 240. As shown in FIG. 2, the print head 240 has a nozzle-forming surface 241 constituting the −Z side surface thereof. Nozzle rows NC, NM, NY, and NK are formed in the nozzle-forming surface 241 of the print head 240. The nozzle rows NC, NM, NY, and NK are for forming dots by ejecting ink droplets in the respective colors C, M, Y, and K. Each nozzle row includes n nozzles NZ (where n is an integer of 2 or greater; n is 100 in the embodiment) spaced at a prescribed nozzle pitch NT in the conveying direction. The nozzle rows are arranged at different positions from each other relative to the main scanning direction. In FIG. 2 and subsequent drawings, the +Y direction denotes the conveying direction (sub scanning direction), and the X direction (+X and −X directions) denotes the main scanning direction. The nozzle NZ in each nozzle row that is positioned on the downstream end in the conveying direction (i.e., the +Y end in FIG. 2) will be called a downstream nozzle NZd, while the nozzle NZ positioned on the upstream end in the conveying direction (i.e., the −Y end in FIG. 2) will be called an upstream nozzle NZu. In the following description, the length in the conveying direction from one specific nozzle NZ (nozzle NZ1, for example) to another specific nozzle NZ (nozzle NZ2, for example) will be called the nozzle length from nozzle NZ1 to nozzle NZ2. The nozzle length from the upstream nozzle NZu to the downstream nozzle NZd in the conveying direction will be called the total nozzle length D (see FIG. 2). Hereinafter, the +Y side will simply be called the "downstream side," while the −Y side will simply be called the "upstream side."

The print head 240 can form dots in a plurality of sizes with each color of ink. Specifically, the print head 240 can form a small dot, a medium dot that is larger than the small dot, and a large dot that is larger than the medium dot. The small dot is the smallest dot that the printing mechanism 200 can form, and the large dot is the largest dot that the printing mechanism 200 can form.

FIG. 3 shows an example of the nozzle property table NPT. The nozzle property table NPT includes four sub-tables for the respective C, M, Y, and K nozzles. For example, the K nozzle sub-table records a nozzle number NKj of the nozzle NZ (where j is an integer such that $1 \leq j \leq n$) in association with a property value PK for each of the n nozzles NZ in the nozzle row NK for K ink. The property value PK is related to the ejection quantity of K ink ejected from the nozzle NZ. The property value PK corresponding to the nozzle number NKj is a numerical value in the range $-20 \leq PK \leq 20$, for example. Similarly, the sub-tables for C, M, and Y nozzles record the respective nozzle number NCj, NMj, and NYj in association with respective property values PC, PM, and PY for each of the n nozzles NZ in the respective nozzle rows NC, NM, and NY for C, M, and Y ink. The property values PC, PM, and PY are respectively related to the ejection quantity of C, M, and Y ink ejected from the corresponding nozzle NZ. These property values are found through an examination performed by the manufacturer of the printer 600 in advance.

The following is an example of how the property value is found for a nozzle NZ for K ink. The manufacturer forms n dots in K ink on paper using the n nozzles NZ that are the subject of examination. Next, the manufacturer measures the density of each dot (e.g., the density per unit area). The manufacturer sets the average density of the n K ink dots to 255, which is the maximum value of 256 gradations from 0 to 255. Next, the manufacturer identifies the density of each of all n dots formed by the n nozzles NZ based on this average density. Consequently, the densities identified for the n dots may include values greater than 255 and values less than 255. The manufacturer then sets the property value PK for each of the n nozzles NZ for K ink based on the difference between the density of each of the n dots and the average density (255 in this case). Accordingly, each property value PK in the embodiment is set to a value within a prescribed range that includes 0, as described above ($-20 \leq PK \leq 20$ in the above example). A property value PK smaller than 0 signifies that the ink ejection quantity from the corresponding nozzle NZ is less than the reference (the average density in this example). A property value PK greater than 0 signifies that the ink ejection quantity from the corresponding nozzle NZ is greater than or equal to the reference.

Property values are similarly set for each of the nozzles NZ for C, M, and Y ink. A nozzle property table NPT that includes property values set in this way is pre-stored in the nonvolatile storage 130 prior to shipping the printer 600.

A-2. Overview of a Control Process

Figure 4:
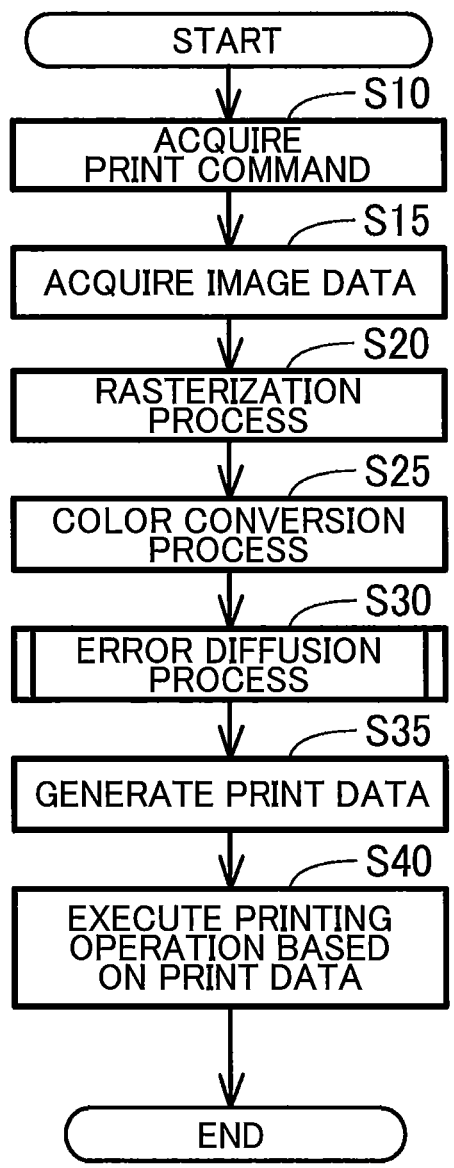
FIG. 4 is a flowchart illustrating steps in a control process according to the embodiment.

The CPU 110 of the control device 100 executes a control process for controlling the printing mechanism 200 to execute a printing operation based on a print command from the user. FIG. 4 is a flowchart illustrating steps in this control process.

In S10 of FIG. 3, the CPU 110 acquires a prescribed print command from the user via the operating section 150. The print command includes at least an instruction specifying image data representing an image to be printed.

In S15 the CPU 110 acquires the image data specified in the print command. For example, the CPU 110 may acquire image data specified by the user from a storage, such as USB memory (not shown) or the nonvolatile storage 130. Alternatively, the CPU 110 may acquire image data that is transmitted together with the print command from a user terminal (not shown). The image data acquired in S15 may be vector data generated by an application program or bitmap data generated by a digital camera, for example.

In S20 the CPU 110 executes a rasterization process on the image data to generate bitmap data that includes the number of pixels depending on the printing resolution. More specifically, the bitmap data is RGB image data representing the color of each pixel in RGB values. Each of the three components included in the RGB values, i.e., each of the R value, G value, and B value, is a gradation value having one of 256 gradation levels from 0 to 255.

In S25 the CPU 110 executes a color conversion process on the RGB image data to generate monochrome image data representing a monochrome image. The monochrome image has a plurality of pixels, and the monochrome image data includes a plurality of gradation values corresponding to the plurality of pixels in the monochrome image. The gradation values specify the densities of the corresponding pixels. The color conversion process is a process for converting RGB values for each pixel in the RGB image data to a luminance according to a well-known method of conversion and for subsequently converting the luminance for each pixel to a gradation value specifying the density of the pixel, for example. The gradation values may be values in one of 256 levels from 0 to 255, for example.

In S30 the CPU 110 executes an error diffusion process on the monochrome image data to generate dot data. The dot data represents a dot image that includes a plurality of pixels. The value for each pixel in the dot data specifies the dot formation state for the pixel. Specifically, each pixel in the dot data has one of four values specifying one of four dot formation states ("large dot," "medium dot," "small dot," and "no dot"). The error diffusion process will be described later in greater detail.

In S35 the CPU 110 generates print data based on the dot data generated in S30. For example, the CPU 110 generates print data by rearranging the dot data into an order used for printing, and by adding print commands and other control data to the rearranged dot data.

In S40 the CPU 110 controls the printing mechanism 200 to execute a printing operation based on the print data generated in S35. Through this process, the control device 100 prints an image on paper.

According to the above description of the embodiment, the control device 100 that includes the CPU 110 is an example of the control device, and the printing mechanism 200 is an example of the print execution machine.

A-3. Overview of a Printing Operation

Figure 5:
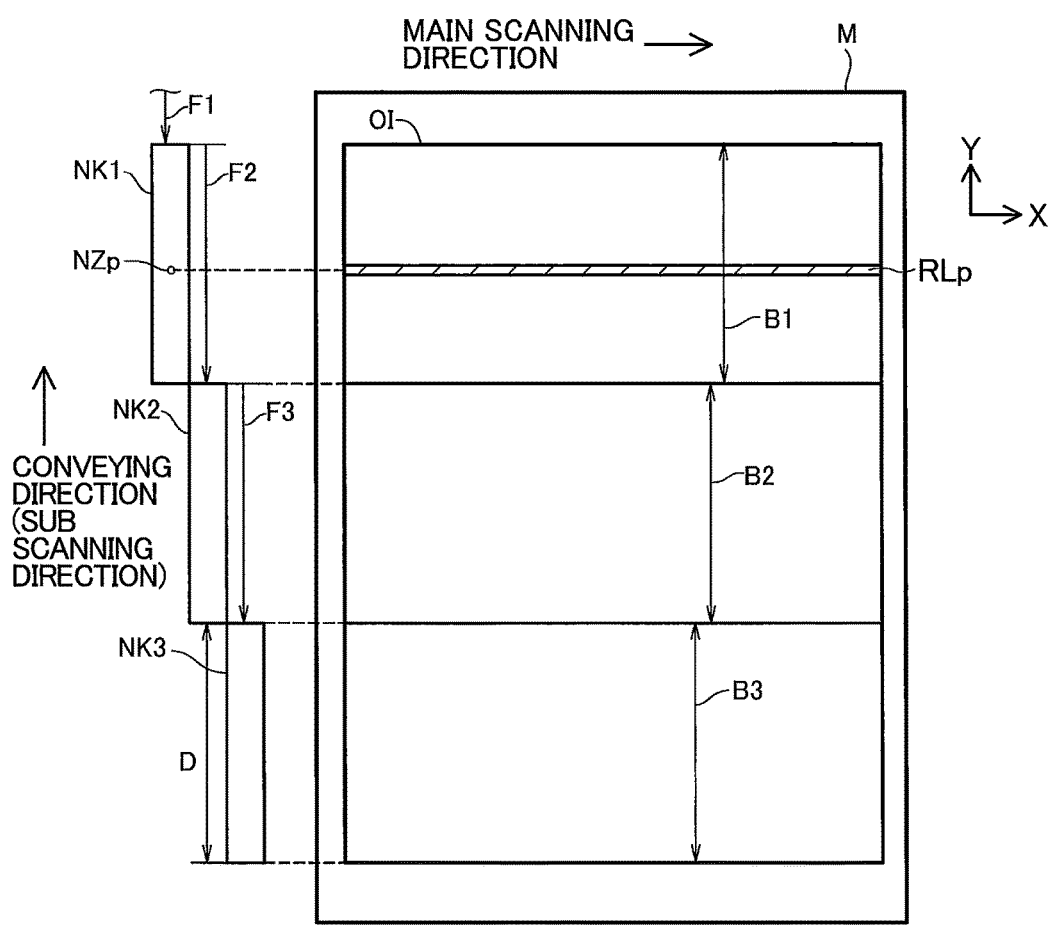
FIG. 5 is an explanatory diagram illustrating a printing operation according to the embodiment.

FIG. 5 is an explanatory diagram for a printing operation according to the embodiment. FIG. 5 shows an original image OI arranged at a desired printing position on the sheet M, and indicates the position of the nozzle row NK in the print head 240 relative to the original image OI in the Y direction for each pass process.

In FIG. 5, the positions of the nozzle row NK indicated by the notation NK1-NK3 are the positions in the conveying direction (Y direction) for the first through third pass processes. The band areas given the notation B1-B3 specify regions on the sheet M in which dots can be formed respectively in the first through third pass processes (i.e., the scanning ranges for the first through third pass processes).

A first conveying process F1 is the process that conveys the sheet M to its initial position, i.e., the position of the sheet M during the first pass process. The second conveying process F2 is executed between the first and second pass processes. The third conveying process F3 is executed between the second and third pass processes. The feed amount for each of the second and third conveying processes F2 and F3 is equivalent to the total nozzle length D. In the embodiment, one-pass printing is executed using nozzles over the total nozzle length D for each pass process and also using the constant feed amount D between pass processes, as illustrated in FIG. 5.

A-4. Error Diffusion Process

Figure 6:
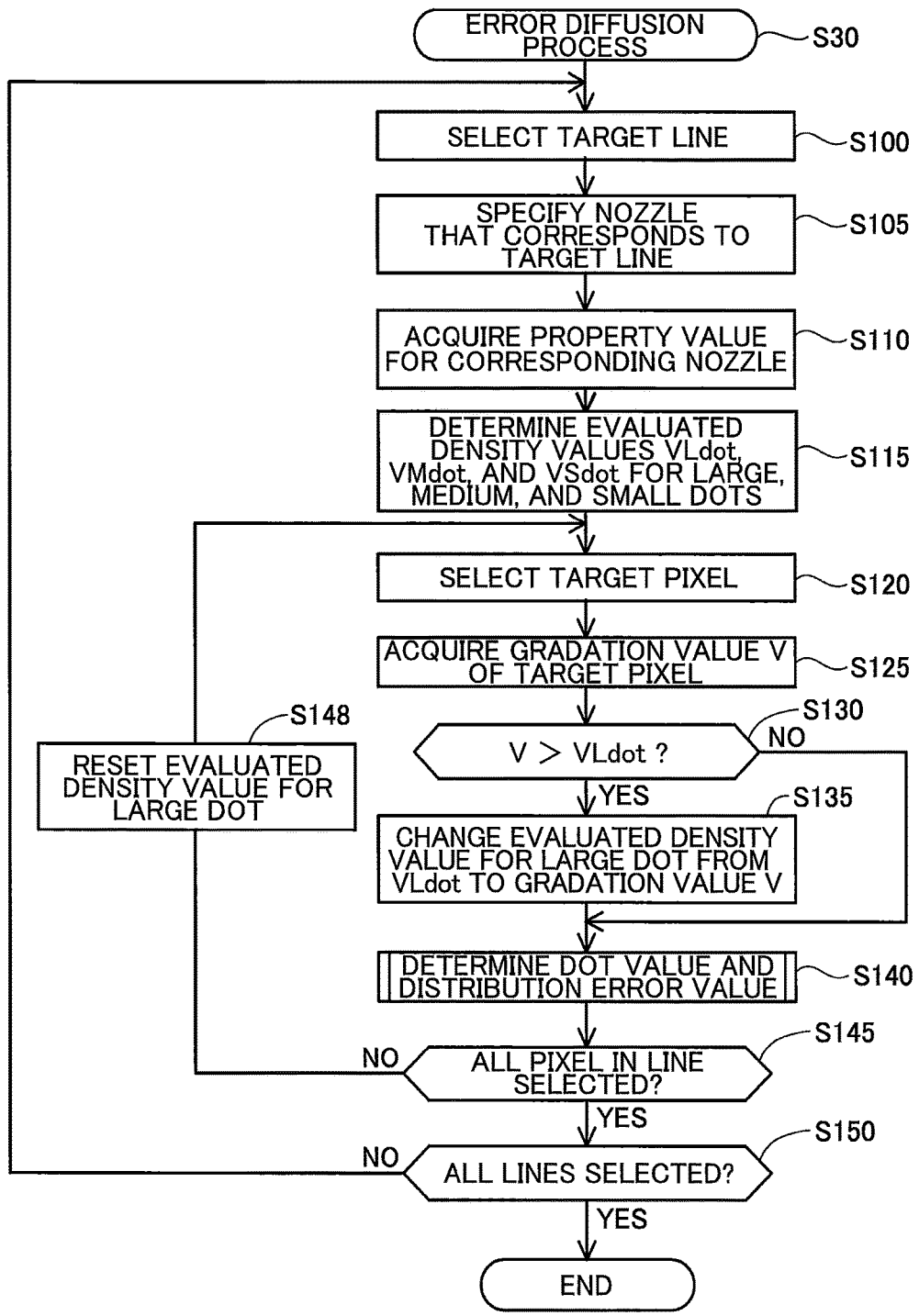
FIG. 6 is a flowchart illustrating steps in an error diffusion process according to the embodiment.

Next, the error diffusion process in S30 of FIG. 4 will be described. FIG. 6 is a flowchart illustrating steps in the error diffusion process.

In S100 of FIG. 6, the CPU 110 selects a single target line from among the plurality of lines in the original image OI (also called "raster lines") represented by the monochrome image data, which is the original image data. The lines in the original image OI of FIG. 5 are each configured of a plurality of pixels aligned in the main scanning direction (X direction). For example, the CPU 110 selects an end line in the +Y direction to be the initial target line, and thereafter selects the line neighboring the current target line on the −Y side to be the next target line.

In S105 the CPU 110 specifies the nozzle that corresponds to the target line (hereinafter called the "corresponding nozzle") from among the n nozzles NZ in the nozzle row NK used to print the original image OI. The corresponding nozzle is the nozzle NZ used for forming dots at positions on the sheet M corresponding to the plurality of pixels in the target line. As an example, the corresponding nozzle for a specific line RLp in the band area B1 of FIG. 5 is a nozzle NZp. The nozzle NZp is disposed over the sheet M at a position in the conveying direction for printing the specific line RLp when the nozzle row NK is at position NK1 for the first pass process.

In S110 the CPU 110 acquires the property value PK for the corresponding nozzle specified in S105 from the nozzle property table NPT. Specifically, the CPU 110 acquires the property value PK associated with the nozzle number of the corresponding nozzle from the sub-table for K nozzles in FIG. 3.

In S115 the CPU 110 determines evaluated density values VLdot, VMdot, and VSdot corresponding to the large dots, medium dots, and small dots, i.e., the various dots used for printing. The evaluated density values VLdot, VMdot, and VSdot specify the densities for the corresponding large dots, medium dots, and small dots. The evaluated density values VLdot, VMdot, and VSdot may be calculated according to equations (1)-(3) below using reference density values VLref, VMref, and VSref for large dots, medium dots, and small dots, respectively; correction coefficients Am and As for medium dots and small dots, respectively; and the property value PK of the corresponding nozzle.

$$V\!Ldot = V\!Lref + PK \quad (1)$$

$$V\!Mdot = V\!Mref + (Am \times PK) \quad (2)$$

$$V\!Sdot = V\!Sref + (As \times PK) \quad (3)$$

The reference density values VLref, VMref, and VSref specify the average density of the corresponding large dots, medium dots, and small dots formed by the n nozzles in the nozzle row NK, for example. The reference density values VLref, VMref, and VSref are normalized so that the reference density value VLref for large dots is the maximum gradation value denoting density in the original image data (255 in the embodiment). For example, when the pixel densities are represented by the 256 gradation levels from 0 to 255 in the embodiment, the reference density values VLref, VMref, and VSref are 255, 128, and 64, respectively. The correction coefficients Am and As are for medium dots and small dots. The correction coefficients Am and As correct the property value PK set for large dots for use with medium and small dots, respectively. For example, Am may be set to (VMref/VLref) and As may be set to (VSref/VLref).

From equations (1)-(3) given above, it is clear that the evaluated density values VLdot, VMdot, and VSdot are set to smaller values than the reference density values VLref, VMref, and VSref when the ink ejection quantity for the corresponding nozzle is less than the reference (average density). Thus, this method can prevent the density of the printed image from becoming too low, even when the ink ejection quantity of the corresponding nozzle is less than the reference.

Further, it is clear from equations (1)-(3) that the evaluated density values VLdot, VMdot, and VSdot are set to values greater than or equal to the reference density values VLref, VMref, and VSref when the ink ejection quantity for the corresponding nozzle is greater than or equal to the reference (average density). Thus, this method can prevent the density of the printed image from becoming too high, even when the ink ejection quantity of the corresponding nozzle is greater than or equal to the reference.

Since VLref=255 and −20≤PK≤20 in the embodiment, the evaluated density value VLdot for large dots calculated in equation (1) may be smaller or larger than the maximum gradation value (255) among densities specified by the original image data.

In S120 the CPU 110 selects a single target pixel from among the plurality of pixels in the target line. For example, the CPU 110 may select target pixels sequentially from the −X end toward the +X end of the target line when the target line is an odd-numbered line, and may select target pixels sequentially from the +X end toward the −X end when the target line is an even-numbered line.

In S125 the CPU 110 acquires a gradation value V in the original image data that specifies the density of the target pixel. In S130 the CPU 110 determines whether the gradation value V of the target pixel is greater than the evaluated density value VLdot for large dots.

When the gradation value V is larger than the evaluated density value VLdot (S130: YES), in S135 the CPU 110 changes the evaluated density value for large dots from the value VLdot calculated in S115 to the gradation value V of the target pixel. When the gradation value V is less than or equal to the evaluated density value VLdot (S130: NO), the CPU 110 skips S135 and advances to S140. Note that when the evaluated density value for large dots is changed from the value VLdot calculated in S115 to the gradation value V of the target pixel in S135, thereafter the new evaluated density value for large dots (i.e., the gradation value V of the target pixel) will also be called the modified evaluated density value. When the CPU 110 reaches a YES determination in S130, the modified evaluated density value (i.e., the gradation value V of the target pixel) is greater than the evaluated density value VLdot set in S115 prior to modification.

In S140 the CPU 110 determines a dot value DV for the target pixel and a distribution error value Ed to be distributed from the target pixel to unprocessed pixels according to an error diffusion method. The unprocessed pixels are pixels that have not been selected as the target pixel in the error diffusion process of FIG. 6, i.e., pixels that have not yet been subjected to the error diffusion process.

Figure 7:
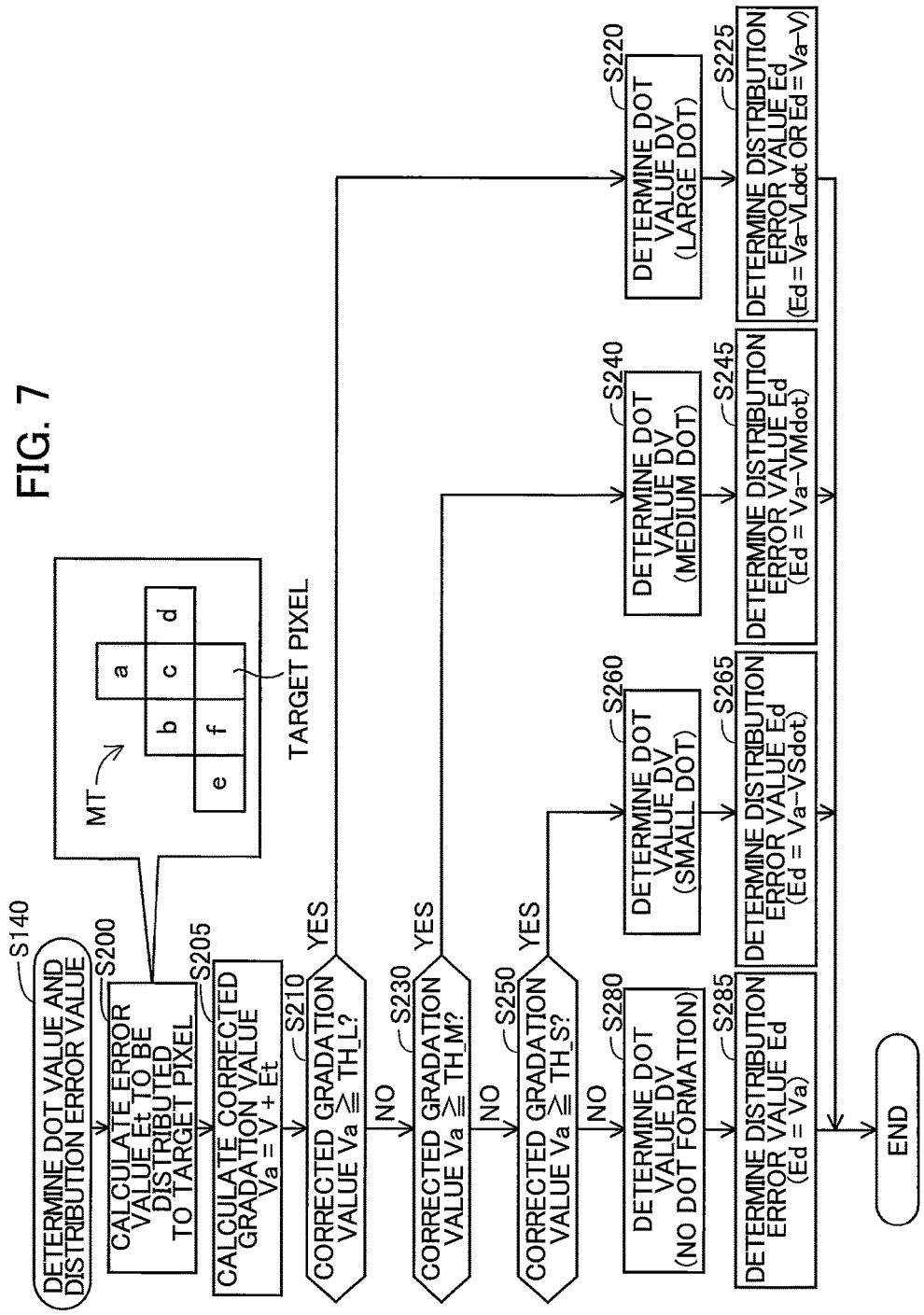
FIG. 7 is a flowchart illustrating steps in a process for determining a dot value and a distribution error value for a target pixel.

FIG. 7 is a flowchart illustrating steps in the process for determining a dot value DV and a distribution error value Ed for a target pixel. In S200 the CPU 110 acquires an error value Et to be distributed to a target pixel from processed pixels that neighbor the target pixel using an error matrix MT. Processed pixels are pixels that were previously selected as the target pixel in the error diffusion process prior to selecting the current target pixel. FIG. 7 shows an example of the error matrix MT. The error matrix MT assigns weights greater than 0 to pixels at prescribed relative positions near the target pixel. In the example of FIG. 7, weights "a"–"f" have been assigned to six pixels near the target pixel. The sum of the weights "a"–"f" is 1. Each of the six processed pixels shown in the error matrix MT that neighbors the target pixel have a corresponding error value (hereinafter called a "distribution error value Ed") that was calculated when the pixel was processed as the target pixel. The CPU 110 calculates the weighted sum of error values corresponding to the six pixels neighboring the target pixel as the error value Et using the weights defined in the error matrix MT.

In S205 the CPU 110 calculates the sum of the gradation value V for the target pixel and the error value Et as a corrected gradation value Va (Va=V+Et).

In S210 the CPU 110 determines whether the corrected gradation value Va is greater than or equal to a large dot threshold value TH_L. The large dot threshold value TH_L is 128, for example, when density is represented in 256 gradation levels from 0 to 255.

When the corrected gradation value Va is greater than or equal to the large dot threshold value TH_L (S210: YES), in S220 the CPU 110 determines the dot value DV to a value specifying formation of a large dot. In S225 the CPU 110 determines the distribution error value Ed for the target pixel to a value obtained by subtracting the evaluated density value for large dots from the corrected gradation value Va. When the CPU 110 executed S135 in FIG. 6 for the current target pixel to modify the evaluated density value for large dots to the gradation value V of the target pixel, then the CPU 110 uses the modified evaluated density value for large dots (i.e., the gradation value V of the target pixel) here. Hence, the distribution error value Ed would be (Va−V) in this case. However, when the CPU 110 did not execute S135 for the current target pixel, then the CPU 110 uses the evaluated density value VLdot for large dots set in S115 of FIG. 6. Hence, the distribution error value Ed is (Va−VLdot) in this case.

When the corrected gradation value Va is less than the large dot threshold value TH_L (S210: NO), in S230 the CPU 110 determines whether the corrected gradation value Va is greater than or equal to a medium dot threshold value TH_M. The medium dot threshold value TH_M is 64, for example, when density is represented in 256 gradation levels from 0 to 255.

When the corrected gradation value Va is greater than or equal to the medium dot threshold value TH_M (S230: YES), in S240 the CPU 110 determines the dot value DV to a value specifying formation of a medium dot. In S245 the CPU 110 determines the distribution error value Ed to a value obtained by subtracting the evaluated density value VMdot for medium dots from the corrected gradation value Va (Ed=Va−VMdot).

When the corrected gradation value Va is less than the medium dot threshold value TH_M (S230: NO), in S250 the CPU 110 determines whether the corrected gradation value Va is greater than or equal to a small dot threshold value TH_S. The small dot threshold value TH_S is 1, for example, when density is represented in 256 gradations from 0 to 255.

When the corrected gradation value Va is greater than or equal to the small dot threshold value TH_S (S250: YES), in S260 the CPU 110 determines the dot value DV to a value specifying formation of a small dot. In S265 the CPU 110 determines the distribution error value Ed for the target pixel to a value obtained by subtracting the evaluated density value VSdot for small dots from the corrected gradation value Va (Ed=Va−VSdot).

When the corrected gradation value Va is smaller than the small dot threshold value TH_S (S250: NO), in S280 the CPU 110 determines the dot value DV to a value specifying no dot formation. In S285 the CPU 110 determines the distribution error value Ed for the target pixel to the corrected gradation value Va (Ed=Va).

After the CPU 110 has set the dot value DV and the distribution error value Ed for the target pixel in S225, S245, S265, or S285, in S145 of FIG. 6 the CPU 110 determines whether all pixels in the current target line have been selected to be the target pixel. When there remains an unprocessed pixel (S145: NO), in S148 the CPU 110 resets the evaluated density value for large dots. Specifically, when the evaluated density value for large dots was just modified in S135 from the evaluated density value VLdot set in S115 to the gradation value V of the target pixel, the CPU 110 returns the evaluated density value for large dots to the evaluated density value VLdot set in S115. When the evaluated density value for large dots was not modified in S135 from the evaluated density value VLdot set in S115, the CPU 110 maintains the evaluated density value for large dots at the evaluated density value VLdot set in S115. Subsequently, the CPU 110 returns to S120 and selects an unprocessed pixel to be the target pixel. Once all pixels have been selected as the target pixel (S145: YES), the CPU 110 advances to S150.

In S150 the CPU 110 determines whether all lines in the original image OI have been selected to be the target line. When there remains an unprocessed line (S150: NO), the CPU 110 returns to S100 and selects an unprocessed line to be the target line. Once all lines have been selected as the target line (S150: YES), the CPU 110 ends the error diffusion process.

In the error diffusion process according to the embodiment described above, the CPU 110 sets the dot value DV for the target pixel based on the gradation value V and the error value Et for the target pixel and the threshold values TH_L, TH_M, and TH_S, and sets a distribution error value Ed appropriate for the dot value DV for the target pixel (S200-S285). Here, the CPU 110 compares the gradation value V of the target pixel to the evaluated density value VLdot for large dots in S130 of FIG. 6 and changes the evaluated density value from the value VLdot to the gradation value V of the target pixel when the gradation value V is greater than the evaluated density value VLdot (S130: YES). Hence, the method of setting the distribution error value Ed when forming a large dot (S225 of FIG. 7) differs according to the result of this comparison.

That is, the CPU 110 sets the distribution error value Ed using the evaluated density value VLdot set in S115 (S225 of FIG. 7) when the dot value DV for the target pixel is set to a value specifying formation of a large dot (S210 of FIG. 7: YES) and the gradation value V of the target pixel is less than or equal to the evaluated density value VLdot set in S115 (S130 of FIG. 6: NO). On the other hand, the CPU 110 sets the distribution error value Ed using a modified evaluated density value (i.e., the gradation value V of the target pixel) that is larger than the evaluated density value VLdot set in S115 (S225 of FIG. 7) when the dot value DV of the target pixel is set to a value specifying formation of a large dot (S210 of FIG. 7: YES) and the gradation value V of the target pixel is larger than the evaluated density value VLdot set in S115 (S130 of FIG. 6: YES). Thus, when the gradation value V of the target pixel is greater than the evaluated density value VLdot (V>VLdot), the distribution error value Ed set in S225 (Va−V) is smaller than the value calculated using the evaluated density value VLdot prior to modification (Va−VLdot). Accordingly, this method can prevent the distribution error value Ed from becoming excessively large, even when the evaluated density value VLdot set in S115 is a relatively small value. Therefore, this method prevents the density in parts of the printed image from becoming greater than that in the original image OI prior to the error diffusion process.

Figure 8A:
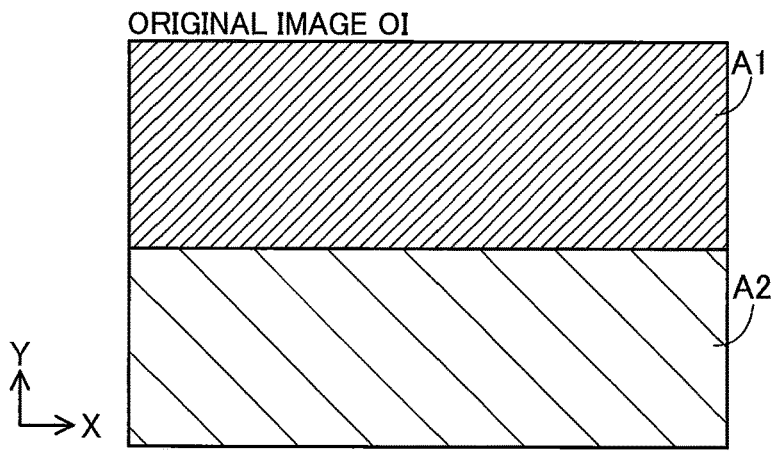
FIG. 8(A) is a drawing illustrating an example of an original image.
Figure 8B:
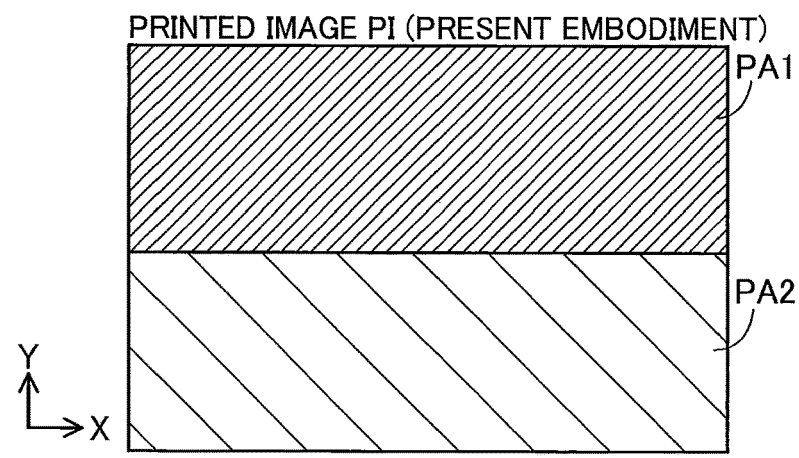
FIG. 8(B) is a drawing illustrating an example of the printed image according to the embodiment.
Figure 8C:
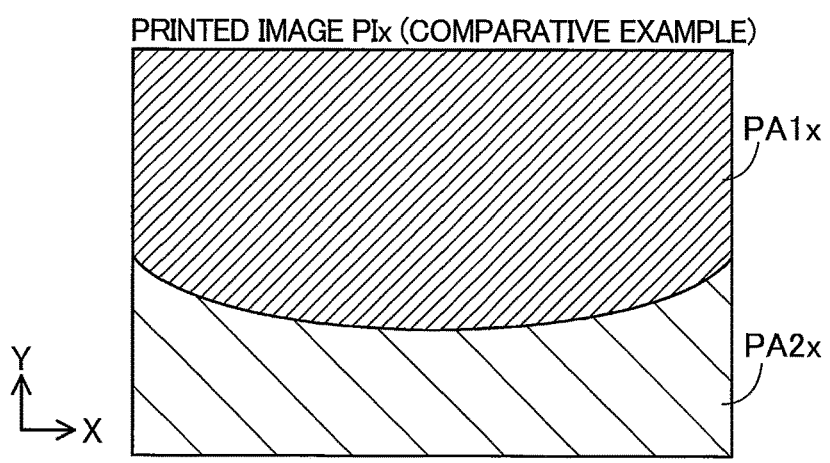
FIG. 8(C) is a drawing illustrating an example of a printed image according to a comparative example.

FIGS. 8(A)-8(C) are a first set of drawings for describing a printed image PI according to the embodiment. FIG. 8(A) shows an example of the original image OI. This original image OI includes a uniform first area A1 having a high density, and a uniform second area A2 having a lower density than the first area A1. The gradation value V for each of the pixels in the first area A1 is a value specifying the maximum density, for example (255 in the embodiment). The gradation value V for each pixel in the second area A2 is a value specifying a density significantly lower than the first area A1, for example (128 in this example).

FIG. 8(B) shows the printed image PI obtained by applying the error diffusion process according to the embodiment to the original image data representing the original image OI in FIG. 8(A). FIG. 8(C) shows a printed image PIx obtained by applying an error diffusion process in a comparative example to the original image data representing the original image OI in FIG. 8(A). The error diffusion process in the comparative example is similar to the process in FIG. 6 without steps S130 and S135. Thus, in the error diffusion process of the comparative example, the CPU 110 always uses the evaluated density value VLdot for large dots set in S115 to calculate the distribution error value Ed in S255 of FIG. 7 (Ed=Va−VLdot).

In the printed image PIx of the comparative example (FIG. 8(C)), a first area PA1x having a high density expands farther in the −Y direction than the first area A1 of the original image OI, particularly in the center region relative to the X direction. Consequently, a second area PA2x having a low density is narrower than the second area A2 of the original image OI. Thus, the error diffusion process in the comparative example produces a region in the printed image PIx, which should represent a partial image in the second area A2 in the original image OI, having a higher density. Thus, the printed image PIx in the comparative example does not accurately represent the original image OI.

In the printed image PI of the embodiment (FIG. 8(B)), a first area PA1 having a high density corresponds to the first area A1 in the original image OI, and a second area PA2 having a low density corresponds to the second area A2 in the original image OI. Thus, the printed image PI in the embodiment can more accurately represent the original image OI than the printed image PIx in the comparative example.

Figure 9A:
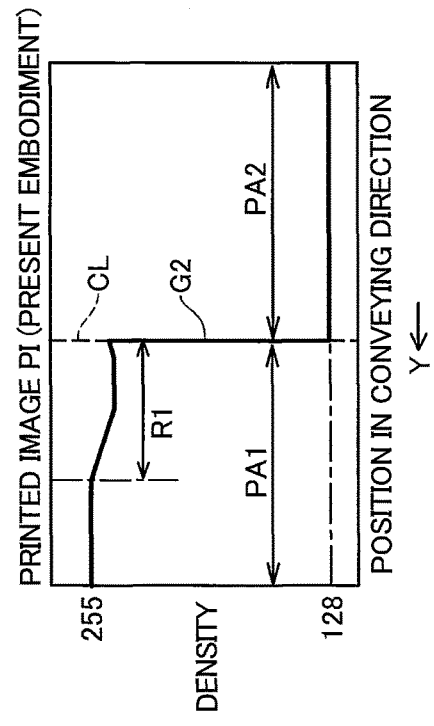
FIG. 9(A) is a graph showing densities of the original image.
Figure 9B:
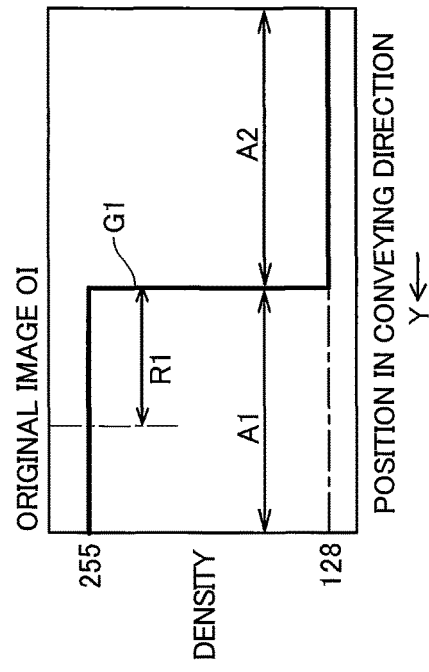
FIG. 9(B) is a graph showing densities of the printed image according to the embodiment.
Figure 9C:
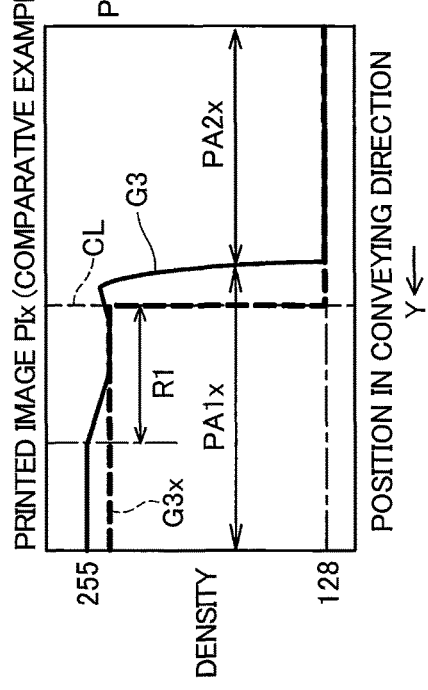
FIG. 9(C) is a graph showing densities of the printed image according to the comparative example.
Figure 9D:
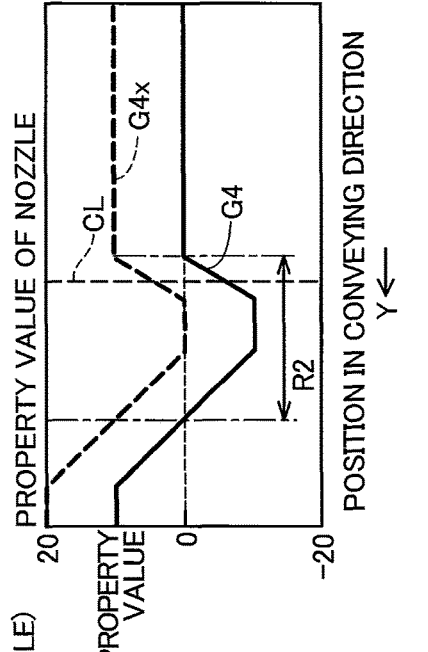
FIG. 9(D) is a graph showing property values of a nozzle.

FIGS. 9(A)-9(D) are a second set of drawings for describing the printed image PI of the embodiment in greater detail. In FIGS. 9(A), 9(B), and 9(C), respective graph lines G1, G2, and G3 are depicted with solid lines. The graph lines G1, G2, and G3 plot the density in the approximate center region relative to the X direction of the original image OI in FIG. 8(A), the printed image PI in FIG. 8(B), and the printed image PIx in FIG. 8(C), respectively, for positions in the conveying direction (Y direction). Using the example of the original image OI in FIG. 9(A), the graph line G1 depicts the density as 255 in the first area A1 and 128 in the second area A2, as described above. In FIG. 9(D), a graph line G4 is depicted by a solid line. The graph line G4 shows the property value PK for each nozzle NZ in the nozzle row NK corresponding to positions in the conveying direction on the printed image PI and printed image PIx. Note that a dashed line CL in FIGS. 9(B), 9(C), and 9(D) denotes the boundary between the first area A1 and second area A2 of the original image OI.

The property values PK depicted by the graph line G4 in FIG. 9(D) drop below 0 in a range R2 in the approximate center region relative to the conveying direction. Therefore, the evaluated density value VLdot for large dots (255+PK) is smaller than 255 in the range R2. The position of the dashed line CL in the conveying direction is within the range R2. When the evaluated density value VLdot for large dots is smaller than 255, the gradation value V of the target pixel is greater than the evaluated density value VLdot. For example, the first area A1 of the original image OI has a range R1 in the conveying direction (see FIG. 9(A)) that falls in the range R2 described above. Since the gradation value V of the target pixels is 255, the gradation value V of the target pixel is greater than the evaluated density value VLdot in the range R1. An upstream end of the range R1 in the conveying direction coincides with the position of dashed line CL in the conveying direction. Consequently, a distribution error value Ed of (255−VLdot) is accumulated for each pixel in the range R1 during the error diffusion process of the comparative example, even when a large dot is formed for all pixels in this range. Thus, in the error diffusion process of the comparative example, large dots continue to be formed due to the accumulated distribution error values Ed even when pixels in the second area A2 of the original image OI are set as the target pixel. This leads to the phenomenon depicted in the printed image PIx of the comparative example in which the first area PA1x having a high density expands farther in the −Y direction than the first area A1 in the original image OI (see FIGS. 8(C) and 9(C)).

According to the embodiment, the evaluated density value is changed from the value VLdot to the gradation value V of the target pixel in S135 of FIG. 6 in the error diffusion process when the gradation value V of the target pixel is greater than the evaluated density value VLdot (S130 of FIG. 6: YES). Since the gradation value V is 255 in the range R1 (FIG. 9(A)) of the first area A1 in the original image OI, for example, the gradation value V of the target pixel in the range R1 is greater than the evaluated density value VLdot. Therefore, in the error diffusion process of the embodiment, the evaluated density value is changed from the value VLdot to the gradation value V of the target pixel (255) within the range R1. Hence, the distribution error values Ed are not excessively accumulated in the range R1 even when large dots are formed for all pixels. Since excessive distribution error values Ed are not accumulated in the error diffusion process of the embodiment, large dots do not continue to be formed unnecessarily when pixels in the second area A2 of the original image OI are set as the target pixel. Thus, the error diffusion process of the embodiment suppresses the phenomenon in which the first area PA1 in the printed image PI expands farther in the −Y direction than the first area A1 in the original image OI and, hence, the printed image PI of the embodiment can accurately represent the original image OI. In this example, the density drops slightly below 255 in the range R1 of both the printed image PI and printed image PIx for the embodiment and comparative example, respectively (see FIGS. 9(B) and 9(C)). This occurs because the property values for nozzles NZ are less than 0 in the range R2 that includes the range R1, as illustrated in FIG. 9(D), causing the density to drop slightly, even when large dots are formed for all pixels.

Note that it is conceivable to employ a method of setting property values PK to be always greater than or equal to 0 and never less than 0, as illustrated by the dashed graph line G4x. In this case, the gradation value V of the target pixel is never larger than the evaluated density value VLdot because the evaluated density value VLdot is always 255 or greater. This method can also suppress excessive accumulation of distribution error values Ed, thereby avoiding the phenomenon in which the first area PA1 having a high density expands farther in the −Y direction than the first area A1 in the original image OI. However, the maximum density that can be rendered in this case is less than 255, as illustrated by the dashed graph line G3x in FIG. 9(C). A drop in the maximum possible density that can be rendered in the printed image may lead to a decline in the quality of the printed image, particularly when the property values PK vary greatly among the nozzles NZ.

In the embodiment, the reference density value VLref for large dots is set to the maximum value that the gradation value V can possess for pixels in the original image data (255 in the embodiment). The evaluated density value VLdot for large dots is then set to a value smaller than the maximum value when the ink ejection quantity for the corresponding nozzle is less than the reference, and is set to a value greater than or equal to the maximum value when the ink ejection quantity is greater than or equal to the reference (see S115 of FIG. 6 and equations (1)-(3)). Consequently, since the evaluated density value VLdot for large dots can be a value smaller than the maximum possible gradation value V, the embodiment can avoid reducing the maximum density that can be rendered in the image, unlike when the evaluated density value VLdot cannot be set to a value smaller than the maximum density.

Further, in the embodiment the CPU 110 sets the distribution error value Ed using the evaluated density value VMdot and the evaluated density value VSdot for medium dots and small dots, respectively, which are both smaller than the evaluated density value VLdot for large dots (S245 and S265 of FIG. 7), when the dot value DV of the target pixel is set to a value specifying the corresponding medium dot or small dot (S230 of FIG. 7: YES or S250: YES). That is, in these cases the evaluated density value VMdot and the evaluated density value VSdot for respective medium and small dots, which are determined in S115, are always used irrespective of the value of the gradation value V for the target pixel. Hence, when the dot value DV of the target pixel is set to a value specifying the formation of a small dot or a medium dot, the CPU 110 can set a suitable distribution error value Ed using a suitable evaluated density value set on the basis of the property value PK. Accordingly, the CPU 110 can suitably adjust the density in the printed image PI based on the properties of the nozzles NZ. The problem of the expanding first area PA1x described above occurs when the evaluated density value VLdot for large dots is smaller than the maximum possible value of the gradation value V. The problem is not related to the evaluated density value VMdot and the evaluated density value VSdot for medium and small dots, respectively. Accordingly, this problem does not occur even when the evaluated density value VMdot and the evaluated density value VSdot are always used irrespective of the value of the gradation value V for the target pixel.

In the embodiment, only in a case where the large dot is the maximum dot size used for printing on the basis of generated print data, the CPU 110 compares the gradation value V to the evaluated density value VLdot for large dots (S130 of FIG. 6), and the CPU 110 determines whether to use the evaluated density value VLdot or a modified evaluated density value (i.e., the gradation value V of the target pixel) on the basis of the result of this comparison. Thus, the method of the embodiment reliably suppresses the problem described above.

In the embodiment, the modified evaluated density value is the gradation value V specifying the density of the target pixel. Thus, when the gradation value V of the target pixel is larger than the evaluated density value VLdot, the CPU 110 can set a suitable distribution error value Ed so as not to accumulate an excessively large error value.

B. Variations of the Embodiment (1) In the embodiment described above, the property values PK recorded in the nozzle property table NPT are used to calculate a different evaluated density value VLdot for each nozzle NZ that corresponds to the target pixel. Accordingly, the gradation value V of the target pixel can be greater than the evaluated density value VLdot. However, the user of the printer 600 may be allowed to select a printing mode that sets the evaluated density value VLdot to a smaller value than normal in order to increase the overall density of the printed image. Since the evaluated density value VLdot is set smaller than 255 in this printing mode, the gradation value V of the target pixel may be larger than the evaluated density value VLdot. In this print mode, as in the embodiment described above, the CPU 110 may use the modified evaluated density value (i.e., the gradation value V of the target pixel) to calculate the distribution error value Ed when the dot value DV is set to a value specifying formation of a large dot and when the gradation value V of the target pixel is larger than the evaluated density value VLdot.

(2) The modified evaluated density value is not limited to the gradation value V of the target pixel used in the embodiment, but may be a value larger than the gradation value V of the target pixel by a prescribed value (1, for example). Or, the modified evaluated density value may be a value larger than VLdot.

(3) The printing mechanism 200 according to the embodiment can form dots in three sizes, i.e., large, medium, and small sizes. Alternatively, the present invention may employ a printing mechanism 200 capable of forming dots in four sizes including extra large, large, medium, and small sizes. In this case, the CPU 110 determines in S130 of FIG. 6 whether the gradation value V of the target pixel is greater than the evaluated density value for extra large dots, which are the maximum size of dots that can be formed. When the gradation value V is greater than the evaluated density value for extra large dots, the CPU 110 calculates the distribution error value Ed using the modified evaluated density value (i.e., the gradation value V of the target pixel) when the dot value DV is set to a value specifying formation of an extra large dot. In other words, the modified evaluated density value may be used when the distribution error value Ed is obtained for the target pixel for which a dot having a maximum size among dots the printing mechanism 200 can form is determined.

(4) The printing mechanism 200 may also be configured to form dots in only one size. In this case, the CPU 110 determines in S130 of FIG. 6 whether the gradation value V of the target pixel is larger than the evaluated density value for the only type of dot. When the gradation value V is greater than the evaluated density value for the only type of dot, the CPU 110 calculates the distribution error value Ed using the modified evaluated density value (i.e., the gradation value V of the target pixel).

(5) In the embodiment described above, the printer 600 prints monochrome images using only the nozzle row NK for K ink. However, the printer 600 may also print color images using all nozzle rows NC, NM, NY, and NK for the CMYK colors. In this case, the CPU 110 executes a color conversion process in S25 of FIG. 3 on the RGB image data to generate CMYK image data for example. The CMYK image data represents the color of each pixel in gradation values for the four CMYK color components (hereinafter called CMYK values). In this case, the CPU 110 performs the color conversion process using a lookup table defining correlations between RGB values and CMYK values, for example. CMYK image data may also be thought of as image data including four sets of component image data corresponding to the CMYK colors of ink. The value for each pixel in each set of component image data includes a gradation value indicating the density of the corresponding ink for the corresponding pixel. In this case, the CPU 110 executes the error diffusion process of S30 on each set of component image data to generate dot data for each component. In S35 the CPU 110 executes the print data generating process using the dot data for each component to generate print data for each component. In S40 the CPU 110 controls the printing mechanism 200 to print a single color image using the print data for each color component.

(6) While the printing mechanism 200 according to the embodiment forms images using ink in the four colors C, M, Y, and K, the present invention may also apply to a monochrome printer that forms images using only K ink, for example. Alternatively, the printing mechanism 200 may employ only C, M, and Y ink or may use ink in one or more other colors in addition to C, M, Y, and K (light cyan (LC) and light magenta (LM), for example). Further, the printing mechanism 200 may employ a different system, such as a laser system for printing images using a single type of toner or a plurality of types of toner as the colorants, for example.

(7) While the control device 100 in the printer 600 executes the control process in FIG. 4 according to the embodiment described above, this process may instead be executed by the CPU of a user terminal device, such as a personal computer or a smartphone. In this case, the terminal device may generate print data by executing the process in S10-S35 described above and may control the printer 600 to execute a print by supplying the print data to the printer 600. Here, the terminal device is an example of the control device, and the printer 600 is an example of the print execution machine.

In place of the terminal device, a server connected to the printer 600 via a network such as the Internet may execute the control process in FIG. 4. In this case, the server executes the control process of FIG. 4 upon receiving a print command from the terminal device or the printer 600. The server generates print data by executing the process in S10-S35 described above and subsequently controls the printer 600 to execute a print by supplying the print data to the printer 600. Note that the server may be a single computer or may be a cloud server that includes a plurality of computers capable of communicating with each other.

(8) In S130 of FIG. 6 according to the embodiment, the CPU 110 compares the gradation value V of the target pixel to the evaluated density value VLdot for large dots. As an alternative, the CPU 110 may obtain a value by adding a prescribed value $\Delta V$ (for example, $-2 \leq \Delta V \leq +2$) to the gradation value V ($V+\Delta V$), and compare the obtained value to the evaluated density value VLdot for large dots, thereby finely adjusting, by using the $\Delta V$ value, the degree in which excessive accumulation of the distribution error value Ed is suppressed. In general, it is preferable to compare a value suited to the gradation value V (the gradation value V itself or ($V+\Delta V$), for example) to the evaluated density value VLdot for large dots. Further, while the modified evaluated density value in S135 is the gradation value V of the target pixel, this value may be ($V+\Delta V$) instead. Thus, the CPU 110 can finely adjust the degree in which excessive accumulation of the distribution error value Ed is suppressed according to the $\Delta V$ value.

(9) In the embodiment described above, part of the configuration implemented in hardware may be replaced with software and, conversely, part of the configuration implemented in software may be replaced with hardware.

When all or some of the functions of the present invention are implemented with computer programs, the programs can be stored on a computer-readable storage medium (a non-temporary storage medium, for example). The programs may be used on the same storage medium on which they were supplied or may be transferred to a different storage medium (computer-readable storage medium). The "computer-readable storage medium" may be a portable storage, such as a memory card or CD-ROM; an internal storage built into the computer, such as any of various ROM or the like; or an external storage, such as a hard disk drive, connected to the computer.

While the disclosure has been described in detail with reference to a specific embodiment and variations thereof, these embodiments are intended to facilitate understanding of the invention and are not intended to limit the invention. It would be apparent to those skilled in the art that many modifications and variations may be made therein without departing from the spirit of the invention, the scope of which is defined by the attached claims.

What is claimed is:

1. A control device comprising a processor configured to perform:
    acquiring original image data representing an original image, the original image including a plurality of pixels, the original image data including a plurality of gradation values corresponding to respective ones of the plurality of pixels, each of the plurality of gradation values representing a density of a corresponding pixel;
    performing an error diffusion process to generate dot data including a plurality of dot values corresponding to respective ones of the plurality of pixels, each of the plurality of dot values indicating a dot formation state of a corresponding pixel; and
    generating print data including the dot data, the print data being processed by a print execution machine to reproduce the original image,
    wherein the performing includes:
    determining a dot value of a target pixel selected from among the plurality of pixels by using a gradation value of the target pixel, an error value, and a threshold value, wherein the error value is distributed to the target pixel from a processed pixel which has been selected as a previous target pixel of the error diffusion process; and
    determining a distribution error value by comparing a gradation dependent value with a first evaluated density value indicating a density of a first dot, the gradation dependent value depending on the gradation value of the target pixel, the distribution error value being to be distributed to an unprocessed pixel for which the error diffusion process has not been performed,
    wherein the determining a distribution error value includes:
    determining the distribution error value by using the first evaluated density value when the dot value of the target pixel indicates formation of the first dot and when the gradation dependent value is smaller than or equal to the first evaluated density value; and
    determining the distribution error value by using a modified evaluated density value greater than the first evaluated density value when the dot value of the target pixel indicates formation of the first dot and when the gradation dependent value is greater than the first evaluated density value.

2. The control device according to claim 1, wherein the print execution machine has a plurality of nozzles configured to eject ink droplets onto a sheet,
    wherein the performing further includes:
    acquiring a plurality of property values corresponding to respective ones of the plurality of nozzles, each of the plurality of property values concerning a quantity of ink droplet ejected from a corresponding nozzle; and
    determining the first evaluated density value by using a property value corresponding to a specific nozzle among the plurality of property values, the specific nozzle being one of the plurality of nozzles which forms the first dot at a position corresponding to the target dot on the sheet,
    wherein when a quantity of ink ejected from the specific nozzle is smaller than a reference value, the first evaluated density value is determined to be smaller than a reference density value set for the first dot.

3. The control device according to claim 2, wherein when the quantity of ink ejected from the specific nozzle is greater than or equal to the reference value, the first evaluated density value is determined to be greater than the reference density value.

4. The control device according to claim 2, wherein each of the plurality of gradation values is represented to fall within a range having a maximum gradation value,
    wherein the reference density value is equal to the maximum gradation value,
    wherein when the quantity of ink ejected from the specific nozzle is smaller than the reference value, the first evaluated density value is determined to be smaller than the maximum gradation value,
    wherein when the quantity of ink ejected from the specific nozzle is greater than or equal to the reference value, the first evaluated density value is determined to be greater than or equal to the maximum gradation value.

5. The control device according to claim 1, wherein the print execution machine is capable of forming the first dot and a second dot smaller than the first dot,
    wherein the performing further includes determining the distribution error value by using a second evaluated density value when the dot value of the target pixel indicates formation of the second dot, wherein the second evaluated density value indicates a density of the second dot and is smaller than the first evaluated density value.

6. The control device according to claim 5, wherein the first dot has a maximum size among sizes of dot used in a printing operation based on the print data.

7. The control device according to claim 1, wherein the modified evaluated density value is a gradation value of the target pixel.

8. A non-transitory computer readable storage medium storing a set of program instructions installed on and executed by a computer, the set of program instructions comprising:
    acquiring original image data representing an original image, the original image including a plurality of pixels, the original image data including a plurality of gradation values corresponding to respective ones of the plurality of pixels, each of the plurality of gradation values representing a density of a corresponding pixel;
    performing an error diffusion process to generate dot data including a plurality of dot values corresponding to respective ones of the plurality of pixels, each of the plurality of dot values indicating a dot formation state of a corresponding pixel; and
    generating print data including the dot data, the print data being processed by a print execution machine to reproduce the original image,
    wherein the performing includes:
    determining a dot value of a target pixel selected from among the plurality of pixels by using a gradation value of the target pixel, an error value, and a threshold value, wherein the error value is distributed to the target pixel from a processed pixel which has been selected as a previous target pixel of the error diffusion process; and determining a distribution error value by comparing a gradation dependent value with a first evaluated density value indicating a density of a first dot, the gradation dependent value depending on the gradation value of the target pixel, the distribution error value being to be distributed to an unprocessed pixel for which the error diffusion process has not been performed, wherein the determining a distribution error value includes:

determining the distribution error value by using the first evaluated density value when the dot value of the target pixel indicates formation of the first dot and when the gradation dependent value is smaller than or equal to the first evaluated density value; and determining the distribution error value by using a modified evaluated density value greater than the first evaluated density value when the dot value of the target pixel indicates formation of the first dot and when the gradation dependent value is greater than the first evaluated density value.

9. The non-transitory computer readable storage medium according to claim 8, wherein the print execution machine has a plurality of nozzles configured to eject ink droplets onto a sheet, wherein the performing further includes:

acquiring a plurality of property values corresponding to respective ones of the plurality of nozzles, each of the plurality of property values concerning a quantity of ink droplet ejected from a corresponding nozzle; and determining the first evaluated density value by using a property value corresponding to a specific nozzle among the plurality of property values, the specific nozzle being one of the plurality of nozzles which forms the first dot at a position corresponding to the target dot on the sheet, wherein when a quantity of ink ejected from the specific nozzle is smaller than a reference value, the first evaluated density value is determined to be smaller than a reference density value set for the first dot.

10. The non-transitory computer readable storage medium according to claim 9, wherein when the quantity of ink ejected from the specific nozzle is greater than or equal to the reference value, the first evaluated density value is determined to be greater than the reference density value.

11. The non-transitory computer readable storage medium according to claim 9, wherein each of the plurality of gradation values is represented to fall within a range having a maximum gradation value, wherein the reference density value is equal to the maximum gradation value, wherein when the quantity of ink ejected from the specific nozzle is smaller than the reference value, the first evaluated density value is determined to be smaller than the maximum gradation value, wherein when the quantity of ink ejected from the specific nozzle is greater than or equal to the reference value, the first evaluated density value is determined to be greater than or equal to the maximum gradation value.

12. The non-transitory computer readable storage medium according to claim 8, wherein the print execution machine is capable of forming the first dot and a second dot smaller than the first dot, wherein the performing further includes determining the distribution error value by using a second evaluated density value when the dot value of the target pixel indicates formation of the second dot, wherein the second evaluated density value indicates a density of the second dot and is smaller than the first evaluated density value.

13. The non-transitory computer readable storage medium according to claim 12, wherein the first dot has a maximum size among sizes of dot used in a printing operation based on the print data.

14. The non-transitory computer readable storage medium according to claim 8, wherein the modified evaluated density value is a gradation value of the target pixel.

15. A method comprising:

acquiring original image data representing an original image, the original image including a plurality of pixels, the original image data including a plurality of gradation values corresponding to respective ones of the plurality of pixels, each of the plurality of gradation values representing a density of a corresponding pixel;

performing an error diffusion process to generate dot data including a plurality of dot values corresponding to respective ones of the plurality of pixels, each of the plurality of dot values indicating a dot formation state of a corresponding pixel; and generating print data including the dot data, the print data being processed by a print execution machine to reproduce the original image, wherein the performing includes:

determining a dot value of a target pixel selected from among the plurality of pixels by using a gradation value of the target pixel, an error value, and a threshold value, wherein the error value is distributed to the target pixel from a processed pixel which has been selected as a previous target pixel of the error diffusion process; and determining a distribution error value by comparing a gradation dependent value with a first evaluated density value indicating a density of a first dot, the gradation dependent value depending on the gradation value of the target pixel, the distribution error value being to be distributed to an unprocessed pixel for which the error diffusion process has not been performed, wherein the determining a distribution error value includes:

determining the distribution error value by using the first evaluated density value when the dot value of the target pixel indicates formation of the first dot and when the gradation dependent value is smaller than or equal to the first evaluated density value; and determining the distribution error value by using a modified evaluated density value greater than the first evaluated density value when the dot value of the target pixel indicates formation of the first dot and when the gradation dependent value is greater than the first evaluated density value.

16. The method according to claim 15, wherein the print execution machine has a plurality of nozzles configured to eject ink droplets onto a sheet, wherein the performing further includes:

acquiring a plurality of property values corresponding to respective ones of the plurality of nozzles, each of the plurality of property values concerning a quantity of ink droplet ejected from a corresponding nozzle; and determining the first evaluated density value by using a property value corresponding to a specific nozzle among the plurality of property values, the specific nozzle being one of the plurality of nozzles which forms the first dot at a position corresponding to the target dot on the sheet, wherein when a quantity of ink ejected from the specific nozzle is smaller than a reference value, the first evaluated density value is determined to be smaller than a reference density value set for the first dot.

17. The method according to claim 16, wherein when the quantity of ink ejected from the specific nozzle is greater than or equal to the reference value, the first evaluated density value is determined to be greater than the reference density value.

18. The method according to claim 16, wherein each of the plurality of gradation values is represented to fall within a range having a maximum gradation value,
wherein the reference density value is equal to the maximum gradation value,
wherein when the quantity of ink ejected from the specific nozzle is smaller than the reference value, the first evaluated density value is determined to be smaller than the maximum gradation value,
wherein when the quantity of ink ejected from the specific nozzle is greater than or equal to the reference value, the first evaluated density value is determined to be greater than or equal to the maximum gradation value.

19. The method according to claim 15, wherein the print execution machine is capable of forming the first dot and a second dot smaller than the first dot,
wherein the performing further includes determining the distribution error value by using a second evaluated density value when the dot value of the target pixel indicates formation of the second dot, wherein the second evaluated density value indicates a density of the second dot and is smaller than the first evaluated density value.

20. The method according to claim 19, wherein the first dot has a maximum size among sizes of dot used in a printing operation based on the print data.

* * * * *